July 26, 1949.　　　　K. R. LARSON　　　　2,477,460
ARTIFICIAL EYE MOUNT
Filed June 22, 1945

Inventor
Karl R. Larson
By his Attorney
Harry W. Kilgore

Patented July 26, 1949

2,477,460

UNITED STATES PATENT OFFICE 2,477,460

ARTIFICIAL EYE MOUNT

Karl R. Larson, Minneapolis, Minn., assignor to The Paul Bunyan Bait Company, Minneapolis, Minn., a corporation of Minnesota Application June 22, 1945, Serial No. 601,027

1 Claim. (Cl. 46—165)

My present invention relates to improvements in artificial eye mount intended for general use on inanimate objects, but especially well adapted for use in attaching artificial eyes to hollow plastic fish baits.

It is well known that it is now the general practice to attach an artificial eye to inanimate objects by securing the same to a peg and inserting the same in a hole in said object. An artificial eye cannot be secured in this manner to a hollow plastic body due to the thinness of its shell.

The object of this invention is to provide an extremely simple and highly efficient mount having an artificial eye attached thereto and in securing the mount to an inanimate object.

To the above end, the invention consists of the novel construction and arrangement of parts hereinafter described and defined in the claim.

In the accompanying drawing, which illustrates the invention, like characters indicate like parts throughout the several views.

Referring to the drawing.

Figure 1:
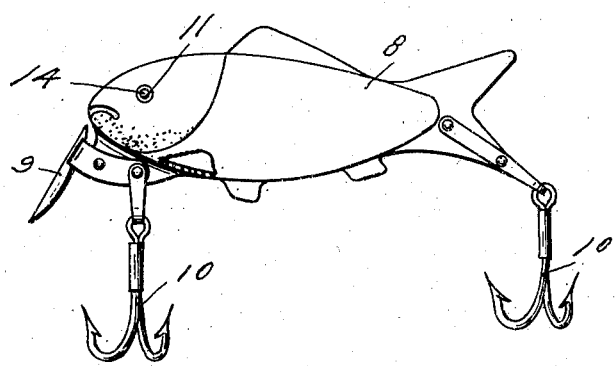
Fig. 1 is an elevation of an artificial fish bait simulating a small fish having the invention embodied therein.
Figure 2:
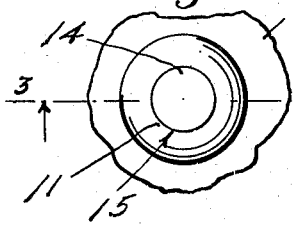
Fig. 2 is an elevational view of the invention and a fragment of the fish bait to which it is attached.
Figure 3:
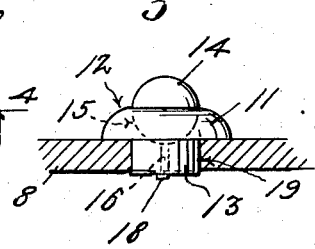
Figs. 3 and 4 are views partly in elevation and partly in section taken on the line 3—4 of Fig. 2.
Figure 4:
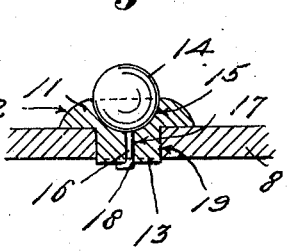

Referring now in detail to the invention shown in Figs. 1 to 4, inclusive, the numeral 8 indicates a hollow plastic artificial bait simulating a small fish. A spoon 9 and two triple hooks 10 are attached to fish bait 8.

A pair of the improved artificial eye mounts 11, only one of which is shown, is secured to the fish bait 8, as will hereinafter appear. The mount 11, shown, is a moulded plastic body in the form of a disk, the upper outer annular edge portion of which is rounded, as indicated at 12. This body 11 has a concentric annular bottom portion 13 of a much smaller diameter.

An artificial eye 14, in the form of a ball, is mounted in a socket 15 in the upper side of the mount 11 at the axis thereof. The artificial eye 14 is attached to a peg 16 which extends through a hole 17 in the body bottom portion 13 and its free end portion is upset as indicated at 18.

The body bottom portion 13 of the mount 11 is fitted in a hole 19 in the shell of the fish bait 8 with the body 11 resting on said bait. In addition to the peg 16, the artificial eye 14 may be further secured to the mount 11 by cementing said eye in the socket 15 and the peg 16 in the hole 17.

Figure 5:
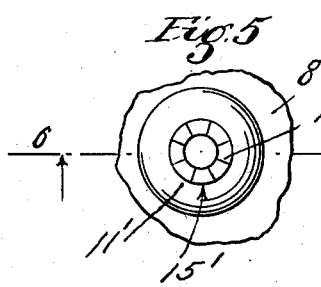
Fig. 5 is a view corresponding to Fig. 2, but showing a slight modification thereof.
Figures 6, 7:
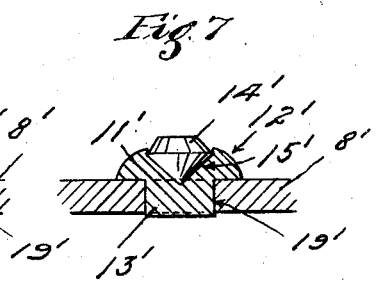
Figs. 6 and 7 are views partly in elevation and partly in section taken on the line 6—7 of Fig. 5.

Referring now in detail to the modification of the invention shown in Figs. 5, 6 and 7, wherein parts that correspond to like parts in Figs. 1 to 4, inclusive, are given the same reference numerals followed by a prime. The only difference between the invention shown in Figs. 1 to 4, inclusive, and that shown in Figs. 5, 6 and 7, is in the form of the artificial eye, which, in Figs. 5, 6 and 7, is a rhinestone.

From the above description, it is evident that the improved mount 11 makes it possible to use a peg in attaching an artificial eye to the thin shell of an inaminate object.

Referring again to the invention shown in Figs. 5, 6 and 7, the rhinestone 14' is mounted in a socket 15' with its greatest diameter below the top of the mount 11' and held in place by friction.

The drawing illustrates commercial forms of the invention, but it will be understood that the same is capable of certain modifications as to details of construction and arrangement within the scope of the invention herein described.

Figure 8:
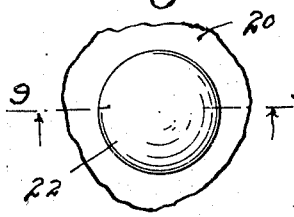
Fig. 8 is a fragmentary elevational view showing a further modification of the invention.
Figure 9:
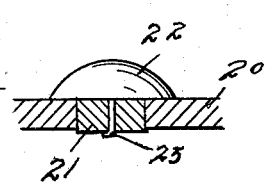
Fig. 9 is a view partly in elevation and partly in section taken on the line 9—9 of Fig. 8.

In the modification shown in Figs. 8 and 9, the numeral 20 indicates a fragment of an artificial bait similar to the artificial bait 8. The mount 21 is a moulded plastic in the form of a disk that snugly fits in an aperture in the bait 20 with its outer face flush with the exterior of the bait 20. An artificial eye 22 resting on the mount 21 is attached thereto by a stem 23, one end portion of which is anchored to said eye. This stem 23 extends through a hole in the mount 21 and its inner end portion is upset to hold said stem against removal from the mount 21. The diameter of the eye 22 is materially larger than the diameter of the mount 21, overlaps the bait 20 and is cemented thereto.

What I claim is:

An artificial eye mount comprising an annular body member, the under side of which is flat and having an integral cylindrical bottom member spaced inwardly from the perimeter of the body member, the under side of the bottom member being substantially parallel to the under side of the body member, the sides of the bottom member being substantially perpendicular to the under side of the body member, said body member having in its top an axial socket, the top of the body member being curved upwardly and inwardly from the bottom of the body member to the socket, an artificial eye in said socket and fitting its contour, said mount having an axial hole extending from the bottom of the socket through the bottom member, and a depending stem on the eye extending through said hole with a tight fit and having its outer end upset to hold the eye in the socket.

KARL R. LARSON.

REFERENCES CITED

The following references are of record in the file of this patent:

UNITED STATES PATENTS

| Number | Name | Date |
|---|---|---|
| 795,109 | Dover | July 18, 1905 |
| 1,073,111 | Fraenkell | Sept. 16, 1913 |
| 1,195,841 | Mowry | Aug. 22, 1916 |
| 1,569,563 | Muller | Jan. 12, 1926 |
| 1,832,743 | Shuldiner | Nov. 17, 1931 |

FOREIGN PATENTS

| Number | Country | Date |
|---|---|---|
| 13,795 | Great Britain | June 9, 1911 |
| 433,067 | Great Britain | Mar. 18, 1935 |